US007897251B2

(12) United States Patent
Courtenay et al.

(10) Patent No.: US 7,897,251 B2
(45) Date of Patent: Mar. 1, 2011

(54) METHOD FOR CATIONIC CONVERSION OF NANO-MILLED CALCIUM CARBONATE

(75) Inventors: Silke Courtenay, San Diego, CA (US); Radha Sen, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1089 days.

(21) Appl. No.: 11/604,487

(22) Filed: Nov. 27, 2006

(65) Prior Publication Data

US 2008/0124500 A1 May 29, 2008

(51) Int. Cl.
*B32B 5/16* (2006.01)
*B41M 5/00* (2006.01)

(52) U.S. Cl. ...... 428/323; 428/330; 428/32.1; 428/32.34

(58) Field of Classification Search ........................ None
See application file for complete search history.

(56) References Cited

U.S. PATENT DOCUMENTS

| | | | |
|---|---|---|---|
| 6,127,315 A | 10/2000 | Shinozaki et al. | |
| 6,197,383 B1 | 3/2001 | Nigam | |
| 6,945,646 B2 | 9/2005 | Ogino et al. | |
| 2002/0172713 A1* | 11/2002 | Einziger et al. | 424/489 |
| 2004/0255820 A1 | 12/2004 | Chen et al. | |
| 2006/0137574 A1 | 6/2006 | Preston et al. | |
| 2006/0162884 A1 | 7/2006 | Gane et al. | |

FOREIGN PATENT DOCUMENTS

| | | |
|---|---|---|
| JP | 11321079 | 11/1999 |
| WO | WO 2004/063287 A1 | 7/2004 |
| WO | WO 2005/003240 A2 | 1/2005 |

OTHER PUBLICATIONS

Varney, D.; "Applications for structured calcium carbonates: micro products with nano functionality"; Conference Proceedings; 2005 (Abstract Only).

Glittenberg et al.; "Novel pigment-starch combination for the online and offline coating of high quality inkjet papers"; Conference Proceedings; Sep. 2004 (Abstract Only).

Glittenberg et al.; "Novel pigment-starch combination for the online coating of high-quality inkjet papers"; Conference Proceedings; Jun. 13-14, 2002 (Abstract Only).

Glittenberg et al.; "New starch-pigment formulations for the online and offline coating of high quality ink jet paper"; Journal; Oct. 2002; vol. 130; No. 19 (Abstract Only).

* cited by examiner

*Primary Examiner* — Sheeba Ahmed

(57) ABSTRACT

A method of forming a print medium comprising coating at least one side of a base substrate with anionically-charged nano-milled calcium carbonate that has been mixed with a cationic conversion agent to convert the coating to a cationically-charged coating, where a primary size of particles of the nano-milled calcium carbonate is 10-20 nm or smaller.

20 Claims, 4 Drawing Sheets

METHOD FOR CATIONIC CONVERSION OF NANO-MILLED CALCIUM CARBONATE

BACKGROUND

The wide-spread use of personal computers and printers has lead to an increased demand for high quality print media. Additionally, digital cameras produce images that can be printed by the average consumer without requiring a professional developing service and have also created an additional need for convenient, high-quality printing capabilities. Though there have been many developments in printing technology, there are always demands for better picture resolution, color formation, image stability, etc.

Print media is commonly paper based, but can also include plastics, metals, composites, fabrics etc. Specialty print media have been developed for many different uses including photo quality paper, high and soft gloss paper, matte paper, photocopy paper, color paper, etc. These print media serve as the image receiver for an image produced with a printing device. In the case of inkjet printers, the print media receives ink droplets from ink cartridges that create a desired image.

The quality of a printed document has traditionally been limited by the characteristics of the print media. Consequently, to enhance the image quality, a print medium often includes a coating on the surface of the print medium. Traditionally, print media are coated either with polymer or pigment compositions and other functional materials configured to promote ink transfer and/or image formation. Additionally, traditional print media coatings and processes are used to enhance the gloss and surface smoothness of the uncoated print media. Differences in various print media characteristics are usually due to differences in the type of coating used.

BRIEF DESCRIPTION OF THE DRAWINGS

The accompanying drawings illustrate various embodiments of the present system and method and are a part of the specification. Together with the following description, the drawings demonstrate and explain the principles of the present system and method. The illustrated embodiments are examples of the present system and method and do not limit the scope thereof.

Throughout the drawings, identical reference numbers designate similar, but not necessarily identical, elements.

DETAILED DESCRIPTION

Figure 1:
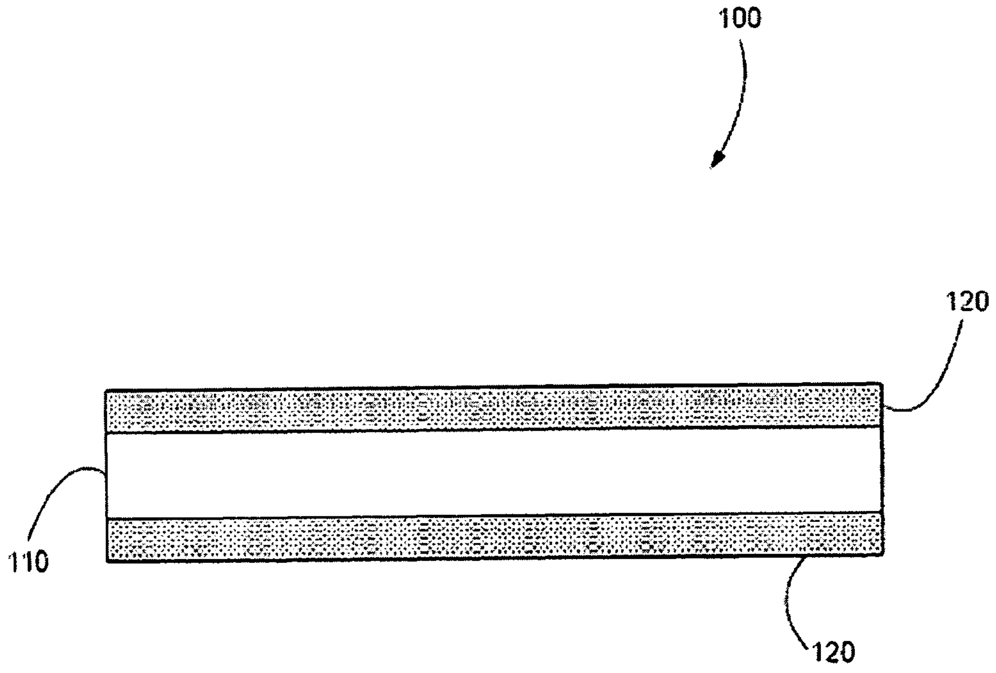
FIG. 1 is a cross-sectional view of a print media, according to one exemplary embodiment.

To enhance the quality of a printed image, as noted above, a print medium often includes a coating on the surface of the print medium. Some such coatings incorporate calcium carbonate and are specifically manufactured to receive ink from a printer or other printing device.

However, when anionically charged calcium carbonate is employed in these ink-receptive coatings, it often precludes anionic ink from properly affixing to the coating. For this reason, these coatings are converted to have a cationic charge that helps the ink properly adhere or affix to the coating.

The present specification describes examples of a coating and a method of forming a coating on a desired substrate that will serve as a print medium having an improved finish, for example, an improved gloss. The coatings described herein, include, for example, nano-milled calcium carbonate particles and exhibit a lower tendency to flocculation and/or agglomeration. Consequently, examples of the coating described herein provide a transparent/translucent glossy coating as opposed to traditional high-opacity calcium carbonate applications that required casting or calendaring to obtain gloss.

According to one exemplary embodiment disclosed herein, a low absorbing/non-absorbing paper-pulp-based medium is coated on at least one side with at least one layer of an image-receiving coating containing nano-milled calcium carbonate. The coating exhibits a relatively low tendency of flocculation while providing a glossy finish. Further details of the present formulation and additional exemplary embodiments will be described in detail below.

Before particular embodiments of the present system and method are disclosed and described, it is to be understood that the present system and method are not limited to the particular processes and materials disclosed herein. It is also to be understood that the terminology used herein is used for the purpose of describing particular embodiments only and is not intended to be limiting. The scope of the present system and method will be defined only by the appended claims and equivalents thereof.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In the following description, for purposes of explanation, numerous specific details are set forth in order to provide a thorough understanding of the present system and method for forming a printable coating comprising cationically-charged, nano-milled calcium carbonate which exhibits a generally low tendency to flocculation. It will be apparent, however, to one skilled in the art that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Overall Structure

While the present system and method may be practiced by any number of methods and on any number of surfaces, the present system and method will be described herein, for ease of explanation only, in the context of forming a printable coating on a substrate. FIG. 1 illustrates a cross-sectional view of a portion of a print medium (100), according to one exemplary embodiment of the principles described herein. As illustrated in FIG. 1, the exemplary print medium (100)

includes at least two components: a base substrate (110) and a printable coating (120) disposed on the base substrate (110).

In the example shown in FIG. 1, the print medium (100) includes a printable coating (120) disposed on both sides of the base substrate (110). However, according to another exemplary embodiment the printable coating (120) may be formed on only one side of the base substrate (110). According to the present exemplary embodiment, the anti-agglomeration performance of the print medium (100) is attributed, at least in part, to the composition of the printable coating (120). The base substrate (110) and the printable coating (120) will now be described in further detail below.

Base Media

As shown in FIG. 1, the base substrate (110) forms the base of the print medium. The present exemplary print medium will be described herein, for ease of explanation only, in the context of a paper stock based medium, for example, a low absorbing/non-absorbing paper-pulp-based medium. However, it will be understood by one of ordinary skill in the art that any number of base media materials might be used by the present system and method including, but in no way limited to, paper base, pigmented paper base, cast-coated paper base, foils, polyethylene-extruded base and films. Further the exemplary base medium can include an offset coating or a resin coating. Alternatively, the exemplary base medium may also be a non-paper based substrate such as a film, a foil, a textile and the like.

Printable Coating

According to one exemplary embodiment, the printable coating (120) formulation disposed on the base substrate (110) comprises from approximately 80 to 100 parts of cationic-converted, nano-milled calcium carbonate (with or without additional anionic dispersant) and up to 20 parts binder, where the binder is compatible with both the calcium carbonate and the dispersant, if any.

Dispersants function to decrease the surface energy or chemical potential of a species in a mixture and/or solution. A lower chemical potential or surface energy typically increases the tendency for the species to remain distributed in a mixture and/or solution. Any number of compatible anionic or nonionic dispersants may be used with the present exemplary system and method. For example, the dispersant may be, but is not limited to, commercially available anionic dispersant Darvan 7, Darvan C, or Acumer9300. Small nano-milled calcium carbonate particles have an increased tendency to remain as small, dispersed particles when any such anionic or nonionic dispersant is present in the system.

Coatings based on calcium carbonate chemistry may be particularly useful as printable coatings due to low cost when compared to other traditional inorganic pigments. Calcium carbonate can be prepared in a number of ways for use in a printable coating.

The present exemplary embodiments use nano-milled calcium carbonate. Nano-milled calcium carbonate has smaller primary particle sizes than traditionally available from natural ground calcium carbonate (GCC) and chemical precipitated calcium carbonate (PCC).

As used herein and in the appended claims, the term "primary" as applied to particle size refers to the size of an individual particle. Thus, a "primary particle" is an individual particle. In contrast, the term "agglomerate size" will refer to the size of a number of individual or primary particles that have agglomerated into a larger structure, which may also be referred to as a "particle."

Calcium carbonate primary particle size and agglomerate size help govern functional features of the resulting printable coatings such as brightness, clarity and gloss. Specifically, smaller particle size typically relates to improved brightness, shade, clarity and gloss. The nano-milled calcium carbonate particles generated in the methods and products described herein can be spherical, almost spherical, or may have other shapes. These nano-milled calcium carbonate particles are typically 10-20 nanometers or less in length or diameter in primary form and agglomerate into formations that are approximately 70 to 200 nanometers in length or diameter.

As noted above, an obstacle in working with small calcium carbonate particles is too much flocculation or agglomeration. As a formulation is processed, small calcium carbonate particles tend to flocculate and form larger aggregate particles. Excessive flocculation of calcium carbonate particles adversely affects the brightness, shade, clarity, gloss, and other characteristics of a printable coating in which the calcium carbonate particles are used.

Charging of the calcium carbonate particles limits this undesirable flocculation. Typically, the calcium carbonate is anionically charged. However, the anionic charge may also prevent anionic ink from properly affixing to the coating. This results in poor image formation or fixation.

Consequently, the anionically-charged calcium carbonate is further combined with a cationic conversion agent and then deposited onto the base substrate (110). The cationic conversion agent creates a cationically-charged coating from a previously anionically-charged coating.

Any number of compatible cationic conversion agents may be used with the present exemplary method. For example, the cationic conversion agent may be, but is not limited to, Silquest 1110, Silquest 1120, Glascol F-111 (polyamine), Glascol F-207 (organic polyelectrolyte), or Glascol F-211 (DADMAC).

There are, however, some flocculation issues that occur during the charge conversion of the calcium carbonate coating. To address such issues, the present exemplary system and method may further incorporate a mixer, such as a high shear mixer, in which the calcium carbonate coating is converted from anionically to cationically charged. The action of the mixer limits flocculation during the charge conversion.

As illustrated in FIG. 1, the printable coating (120) adheres to the base substrate (110). Binders may be used to maintain printable coating cohesion, i.e. keeping the particles together, and may also help with the coating (120) adhesion to the base substrate (110). According to one exemplary embodiment, the printable coating (120) formulation comprises up to 20 percent binder.

The binder is maintained at an alkaline pH in order to be compatible with the calcium carbonate and the dispersant. An alkaline pH influences particle size by preventing the calcium carbonate from dissolving, as well as positively affecting print medium properties such as gloss, surface charge, and capacity. The binder should be compatible with the dispersant and calcium carbonate in order to maintain the functional properties of both the dispersant and nano-milled calcium carbonate particles.

Examples of some suitable binders for use with the present exemplary formulation include, but are in no way limited to, binders based on polyurethane, anionic or non-ionic lattices, as well as swellable polymers such as polyvinylpyrrolidone/polyvinylimidazol copolymer, polyvinylalcohol, polyvinylacetate, and cellulose.

The foregoing coating formulations, when formed and applied to a desired substrate, exhibit limited flocculation or agglomeration of nano-milled calcium carbonate. The result is enhanced brightness, clarity and gloss of the coating.

Exemplary Implementation and Operation

Figure 2:
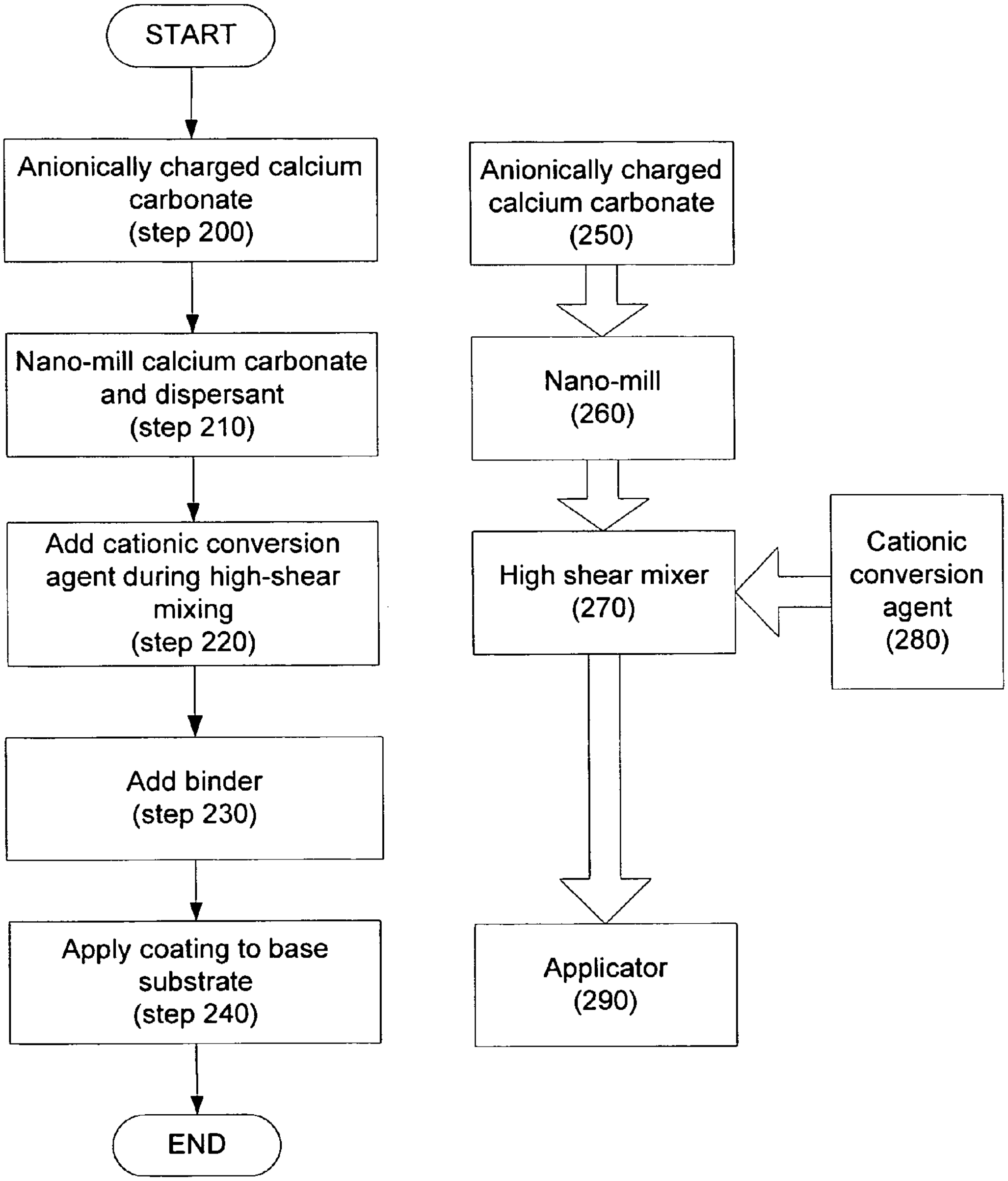
FIG. 2 is a flow chart illustrating a method for forming a cationic receiving layer, according to one exemplary embodiment.

FIG. 2 illustrates a method for forming a print medium (e.g., 100, FIG. 1) according to one exemplary embodiment. As illustrated in FIG. 2, the exemplary method begins by, first, providing anionically-charged calcium carbonate (step 200). Examples of possible PCC and/or GCC that may be used with the present exemplary method include, but are in no way limited to, commercially available Hydrocarb 60, Multiflex MM, or Opacarb A 40.

The calcium carbonate (250) may have some anionic charge. Alternatively or additionally, the calcium carbonate may be mixed with an anionic dispersant to increase the overall anionic charge of the material.

Next, the calcium carbonate (and dispersant, if present), is nano-milled (step 210) in a suitable nano-mill (260). The milling is conducted, as will be described in more detail below, to produce calcium carbonate primary or individual particles that measure 10-20 nm or smaller in length or diameter. Traditional methods of using calcium carbonate in print media have been limited to, and relied on, much larger calcium carbonate particles.

The calcium carbonate particles agglomerate during subsequent processing into larger structures of, for example, 70-200 nm. However, measures are taken to limit the agglomeration to within that range where possible.

medium. The various steps of the foregoing method will now be described in further detail below.

As shown in FIG. 2, the first step of the present exemplary method is to prepare an anionically-charged calcium carbonate (step 200). In the present example, this charged calcium carbonate is prepared as a slurry.

As mentioned above, the calcium carbonate slurry may, in some embodiments, include an anionic dispersant to increase the anionic charge of the slurry. Suitable dispersants for use in the present exemplary method include, but are in no way limited to, Darvan 7, Darvan C, and/or Acumer9300. According to one exemplary embodiment, the exemplary slurry contains approximately 40% solids in water and up to 2.5% dispersant.

Next, the calcium carbonate and dispersant, if any, are nano-milled (step 210). According to one exemplary embodiment, the exemplary slurry is loaded into a re-circulation tank and pumped through a grinding chamber loaded with Yttrium Stabilized Zirconium (YTZ) beads. YTZ beads suitable for use in the present exemplary embodiment typically range from 0.1 to 0.3 mm in diameter. The nano-milling process is capable of, but not required to, generate calcium carbonate particles as small as 70 nm or smaller.

Table 1 presents properties of calcium carbonate particles resulting from several nano-milling processes similar to those described herein.

TABLE 1

| Material | Surfactant | Final Solids % | Final Surfactant % | Beads (mm) | Final particle size (Vol. Median microns) | Final particle size (Number Median) |
|---|---|---|---|---|---|---|
| Hydrocarb 60 | Darvan 7 | 73 | 2.50 | 0.2 | 0.193 | 0.107 |
| Hydrocarb 60 | Darvan 7 | 24.3 | 1.20 | 0.1 | 0.142 | 0.0907 |
| Hydrocarb 60 | Acumer 9300 | | 12.5 | 0.3 | 0.193 | 0.093 |
| MultiflexMM | Acumer 9300 | | 12.5 | 0.3 | 0.126 | 0.08 |
| MultiflexMM | Darvan 7 | 40 | 2.80 | 0.2 | 0.138 | 0.073 |
| MultiflexMM | Darvan 7 | 27 | 1.10 | 0.1 | 0.128 | 0.0776 |
| MultiflexMM | Acumer 9300 | 26.4 | 3.00 | 0.1 | 0.082 | 0.071 |
| OpcarbA40 | Darvan 7 | 43 | 1.60 | 0.2 | 0.174 | 0.076 |
| OpcarbA40 | Acumer 9300 | 25 | 1.30 | 0.1 | 0.1576 | 0.11 |

As noted above, the anionic-charging of the calcium carbonate is useful in limiting agglomeration or flocculation. However, because the calcium carbonate is anionically-charged, it may prevent or preclude optimal ink fixation on the medium.

Consequently, the calcium carbonate is cationically converted to better permit ink fixation. A cationic conversion agent is added to the anionically-charged calcium carbonate (step 220). The cationic conversion agent (280) may be added while the nano-milled calcium carbonate is being agitated or mixed in, for example, a high-shear mixer (270). The motion and kinetic energy imparted to the nano-milled calcium carbonate by the mixer (270) helps to limit agglomeration during the charge conversion.

After cationic conversion, the calcium carbonate mixture is mixed with a binder (step 230) to complete the printable coating formulation. As described above, the binder promotes the cohesion of the resulting coating as well as the ability of the coating to adhere to the base substrate of the print medium.

The resulting printable coating formulation is then deposited on at least one surface of the base substrate (step 240) using an applicator (290) to produce the desired print After the exemplary slurry is nano-milled (step 210) by the nano-milling process, a cationic conversion agent is added to the anionically-charged calcium carbonate slurry (step 220). As discussed previously, these cationic conversion agents may include, but are not limited to, Silquest 1110, Silquest 1120, Glascol F-111 (polyamine), Glascol F-207 (organic polyelectrolyte), or Glascol F-211 (DADMAC). The conversion agent will react with the slurry to change the charge from anionic to cationic.

The cationic conversion may be conducted in a high-shear mixer which limits the agglomeration of the mixture during the conversion to a cationic charge. If the agglomeration is not limited, the resulting print media coating will tend to be opaque and excessively viscous, rendering it less suitable for a high-quality print medium product.

A binder is then added (step 230) to create a cohesive printable coating formulation. According to one exemplary embodiment, the formation of the printable coating formulation includes mixing up to 20 parts binder with between 80 and 100 parts dispersant-calcium carbonate mixture. When combined, the binder serves to hold the dispersant-calcium carbonate mixture together. In addition, the binder may also adhere the formulation to the base media. Examples of suitable binders in the present exemplary embodiment include, but are in no way limited to, binders based on polyurethane, anionic or non-ionic lattices, as well as swellable polymers such as polyvinylpyrrolidone/polyvinylimidazol copolymer, polyvinylalcohol, polyvinylacetate, and cellulose.

In addition to the above-mentioned components, the present exemplary coating formulation may also include any number of additives such as mordents, surfactants, viscosity modifiers, surface tension adjusting agents, rheology adjusting agents, pH adjusting agents, drying agents, colors, and the like, as is well known in the art.

When the printable coating formulation is formed, a layer or layers can be applied to one or both sides of a base substrate (step 240). The layer(s) can be applied to the base substrate using an on-machine or off-machine coater. Examples of suitable coating techniques include, but are not limited to, slot die coaters, roller coaters, curtain coaters, blade coaters, rod coaters, air knife coaters, gravure application, air brush application and other techniques and apparatuses known to those skilled in the art.

According to one exemplary embodiment, a single layer of pigment coating (120) may be formed on the base substrate (110). Alternatively, multiple layers including a base layer and top layers of pigment coating (120) may be formed on the substrate (110) to achieve a desired print medium or print medium properties.

Figure 3:
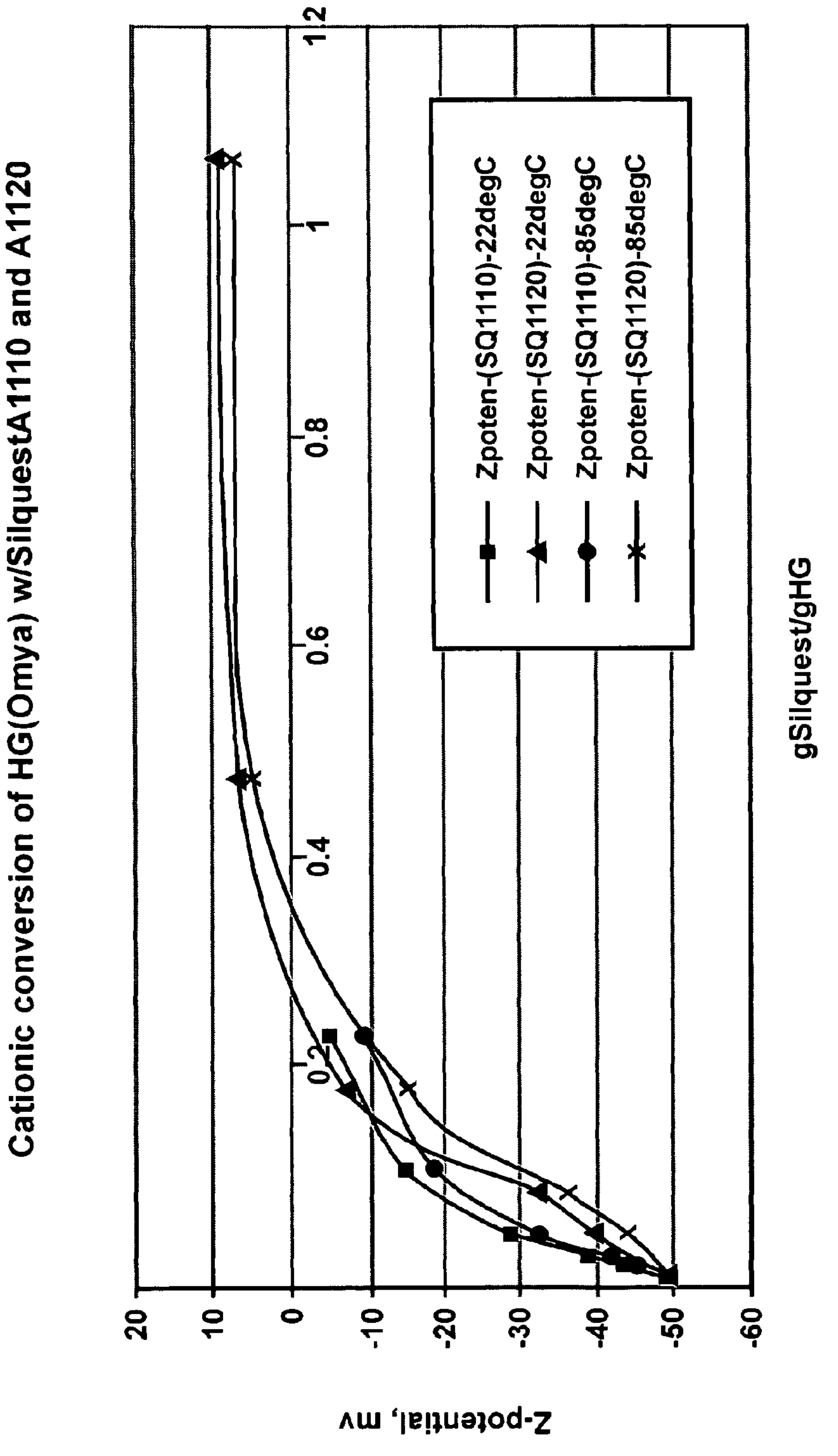
FIG. 3 is a chart showing cationic conversion of nano-milled calcium carbonate using a different cationic conversion agent according to principles described herein.

FIG. 3 is a chart showing cationic conversion of nano-milled calcium carbonate using a different cationic conversion agent according to principles described herein.

Figure 4:
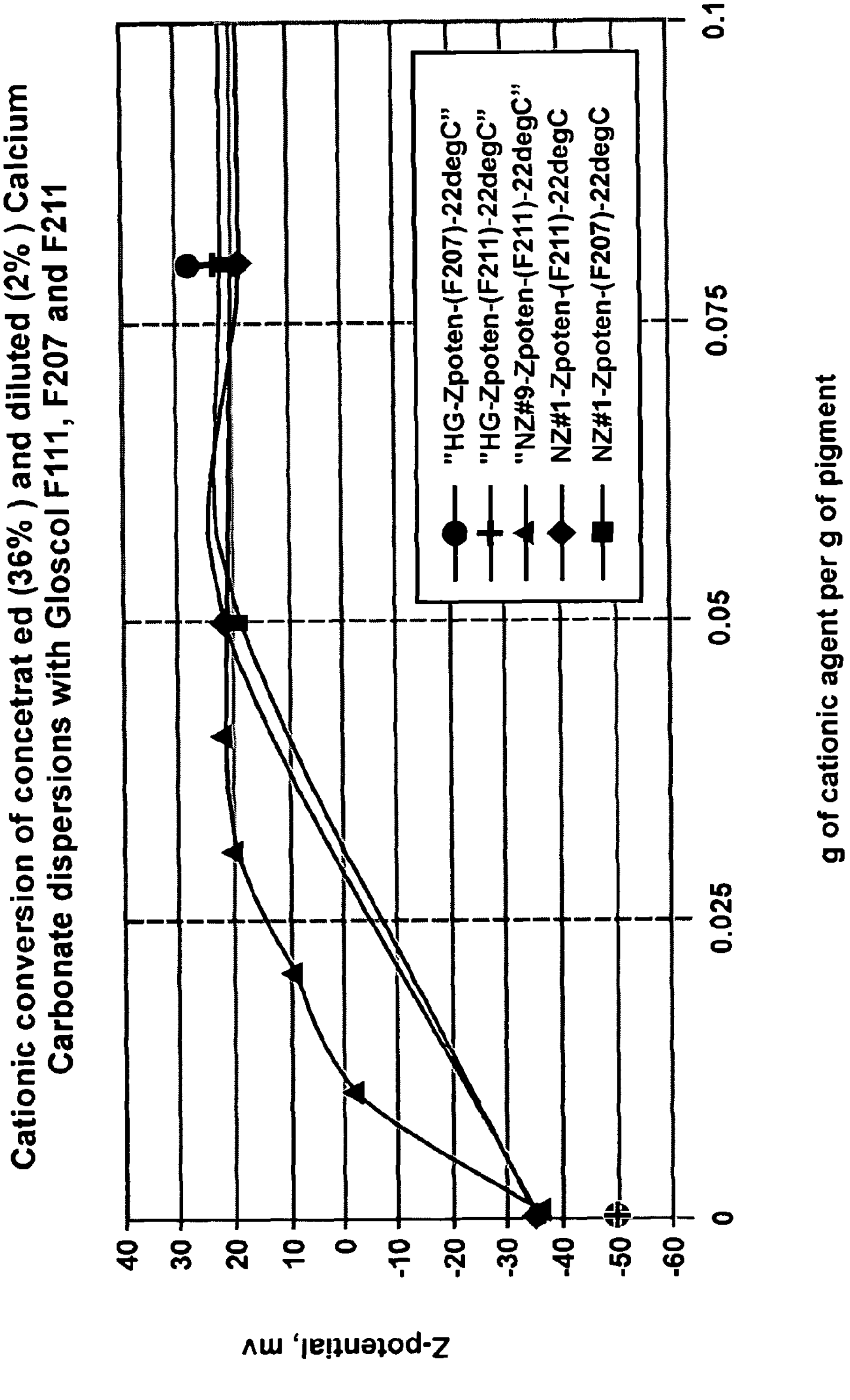
FIG. 4 is a chart showing cationic conversion of nano-milled calcium carbonate using a different cationic conversion agent according to principles described herein.

FIG. 4 is a chart showing cationic convertion of nano-milled calcium carbonate using a different cationic conversion agent according to principles described herein.

In conclusion, the present exemplary method for cationic conversion of calcium carbonate forming a printable coating comprising adding a cationic conversion agent to a nano-milled, anionically-charged calcium carbonate there by forming a printable coating with a compatible binder and any other necessary additives.

The preceding description has been presented only to illustrate and describe the present method and system. It is not intended to be exhaustive or to limit the present system and method to any precise form disclosed. Many modifications and variations are possible in light of the above teaching. The foregoing embodiments were chosen and described in order to illustrate principles of the system and method as well as some practical applications. The preceding description enables others skilled in the art to utilize the method and system in various embodiments and with various modifications as are suited to the particular use contemplated. It is intended that the scope of the method and system be defined by the following claims.

What is claimed is:

1. A method of forming a print medium comprising:

providing anionically-charged nano-milled calcium carbonate;

adding a cationic conversion agent to said nano-milled calcium carbonate; and coating at least one side of a base substrate with said mixture of anionically-charged nano-milled calcium carbonate and said cationic conversion agent, wherein a primary size of particles of said nano-milled calcium carbonate is 10-20 nm or smaller, and in which the addition of said cationic conversion agent to said nano-milled calcium carbonate is conducted in a mixer configured to limit agglomeration of said mixture during cationic conversion.

2. The method of claim 1, further comprising adding a binder to said coating.

3. The method of claim 2, wherein said binder comprises up to 20% of said coating.

4. The method of claim 2, wherein said binder has an alkaline pH.

5. The method of claim 2, wherein said binder is nonionic.

6. The method of claim 1, wherein said nano-milled calcium carbonate agglomerates to structures between 70 and 200 nanometers.

7. The method of claim 1, further comprising nano-milling said calcium carbonate to a primary particle size of 10-20 nm or smaller.

8. The method of claim 7, further comprising adding a dispersant to said calcium carbonate before said nano-milling.

9. The method of claim 7, wherein said nano-milling comprises circulating a calcium carbonate slurry through a grinding chamber loaded with beads.

10. The method of claim 9, wherein said beads are Yttrium Stabilized Zirconium beads.

11. The method of claim 9, wherein said beads have a diameter of 0.1 to 0.3 mm.

12. A method of forming a print medium comprising:

nano-milling calcium carbonate particles to a primary size between 10 and 20 nanometers or smaller; and applying a coating to a base substrate, said coating comprising said nano-milled calcium carbonate.

13. The method of claim 12, wherein said nano-milling comprises circulating a calcium carbonate slurry through a grinding chamber loaded with beads.

14. The method of claim 13, wherein said beads are Yttrium Stabilized Zirconium beads.

15. The method of claim 13, wherein said beads have a diameter of 0.1 to 0.3 mm.

16. A print medium comprising:

a base substrate; and a coating on at least one side of said substrate;

wherein said coating comprises nano-milled calcium carbonate mixed with a cationic conversion agent to convert said coating to a cationically-charged coating, wherein a primary size of particles of said nano-milled calcium carbonate is 10-20 nm or smaller.

17. The medium of claim 16, wherein said coating further comprising a binder.

18. The medium of claim 17, wherein said binder comprises up to 20% of said coating.

19. The medium of claim 17, wherein said binder has an alkaline pH.

20. The medium of claim 16, wherein said nano-milled calcium carbonate particles agglomerate into formations no larger than 200 nanometers.

* * * * *